Nov. 20, 1951        F. W. LEE        2,575,349

GEOPHYSICAL SURVEYING

Filed Jan. 6, 1949        3 Sheets-Sheet 1

INVENTOR
Frederick W. Lee.

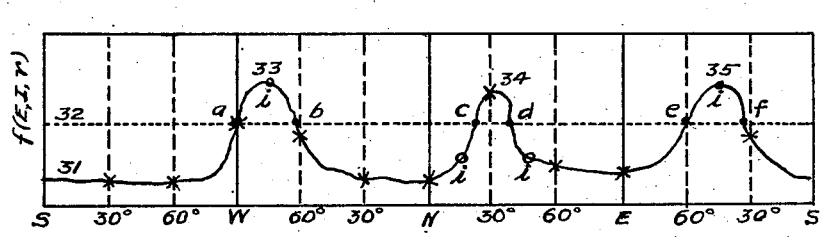
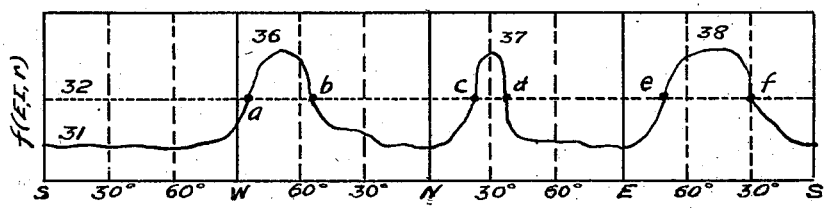
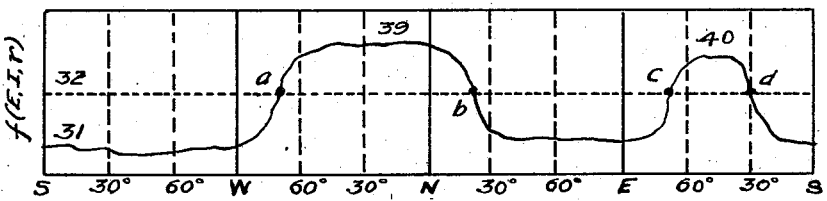
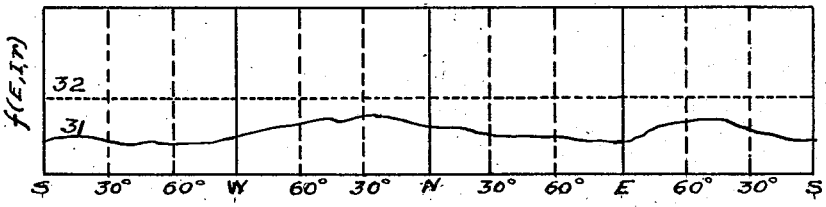
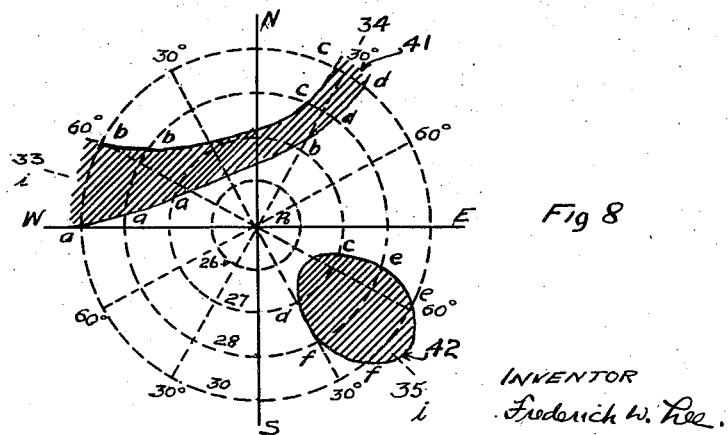
INVENTOR
Frederick W. Lee.

Nov. 20, 1951 F. W. LEE 2,575,349
GEOPHYSICAL SURVEYING
Filed Jan. 6, 1949 3 Sheets-Sheet 3

INVENTOR
Frederick W. Lee.

Patented Nov. 20, 1951

2,575,349

UNITED STATES PATENT OFFICE 2,575,349

GEOPHYSICAL SURVEYING

Frederick W. Lee, Owings Mills, Md.

Application January 6, 1949, Serial No. 69,548

9 Claims. (Cl. 175—182)

(Granted under the act of March 3, 1883, as amended April 30, 1928; 370 O. G. 757)

The invention described herein may be manufactured and used by or for the Government of the United States for governmental purposes without payment of any royalty thereon.

This invention relates to electrical systems of geophysical surveying which are especially adapted to delineate subterranean geologic bodies. It is applicable to systems of this type employing surface contacts, as well as those employing a combination of surface and surface-remote contacts in wells, drill holes, mine shafts, drifts, adits, etc., such as shown, for example, in my prior Patent No. 2,440,693.

Among the objects and advantages of the invention, severally and interpendently, are: (1) To render more exact the data obtainable by electrical geophysical surveying; (2) to render more complete the data so obtainable; (3) to render the data obtained sufficiently complete and concrete to free its interpretation from the errors heretofore introduced by the personal equations, wishes, judgments and so-called "hunches" of the operators; (4) to provide a system affording data for any desired direction, or an infinite number of directions, of current application without requiring the positioning of current electrodes in the respective directions; and (5) to materially reduce the costs of making field measurements in such a system.

Additional and subsidiary objects and advantages of the several features and combinations of the invention will be apparent from the following detailed description of illustrative embodiments of the invention. The invention itself comprises the novel features and methods and combinations herein exemplified and is defined in the appended claims.

By the measurement of currents, potentials and separations of current and potential contacts it is possible to compute the apparent electrical resistivity, resistivity gradient, polarization, polarization gradients, as well as other customary electrical field characteristics or functions of the same, defined both in magnitude and direction. In the present specification, for simplicity, these factors have been designated as $f(E,I,r)$ where $E$ denotes potentials, $I$ currents and $r$ distances. For example, the potential resulting at a point $a$ from any number of current contacts made at the ground surface can be expressed by $$V_a = \frac{\rho}{2\pi} \sum \frac{I}{r_a} \quad \text{(Eq. 1)}$$

where the $r$ values are measured from $a$ to the current contacts, and the $I$ values are the currents at the respective contacts. Similarly, the potential resulting therefrom at a point $b$ may be expressed by $$V_b = \frac{\rho}{2\pi} \sum \frac{I}{r_b} \quad \text{(Eq. 2)}$$

where the $r$ values are measured from $b$ to the current contacts, and the $I$ values are the currents at the respective contacts. The difference of potential $E$ between points $a$ and $b$ may then be expressed as $$V_a - V_b = \frac{\rho}{2\pi} \left( \sum \frac{I}{r_a} - \sum \frac{I}{r_b} \right) \quad \text{(Eq. 3)}$$

From Equation 3 it can be seen, for example, that the apparent resistivity $\rho$ becomes a function of the values $E$, $I$ and $r$ designated $\rho = f(E,I,r)$. Other pertinent functions can be computed based on the elemental knowledge of electrical current and potential fields. It is well recognized that one of the simplest means of applying current to the ground is by two ground contacts although the above equation holds for any number of them, each carrying the same or different current values. The potentials are measured on the ground surface contacts and can be obtained from the above relations for which they are accurate for uniform material. The depth of the current field is controlled by the separation of the ground current contacts. Where the ground material is not uniform the change of such values indicates a change of the conducting properties of the ground. There is a great advantage of so grouping these measurements as will permit the establishment of symmetrical ground patterns of current and potentials which will provide a symmetrical pattern of observation with a minimum of field work. A balanced system of separation of measurements contributes greatly to a clear picture of the underground geological condition as for example a sand pattern which carries oil. With the limits set by the current contacts to the ground there is only a limited spread or area where potential measurements are usable. The present specification discloses a procedure for securing the maximum useful area with a balanced separation of measurements. It shows how with this procedure of a balanced system of measurement a clear picture may be obtained of the underground sand pattern. A haphazard system of measurements cannot be used successfully for delineating the geologic bodies in question. The present specification furthermore teaches how with the electrical underground field in mind it is possible to greatly reduce the costs of obtaining the measurements by a unique ground contact arrangement.

Referring now to the accompanying drawings of exemplary embodiments of the invention:

Figs. 4, 5, 6 and 7 are interpretation diagrams of observations made according to the plan of Fig. 3.

Fig. 8 is a chart showing the final result or delineation of the geologic bdies under investigation in Figs. 4 to 7.

Figure 1:
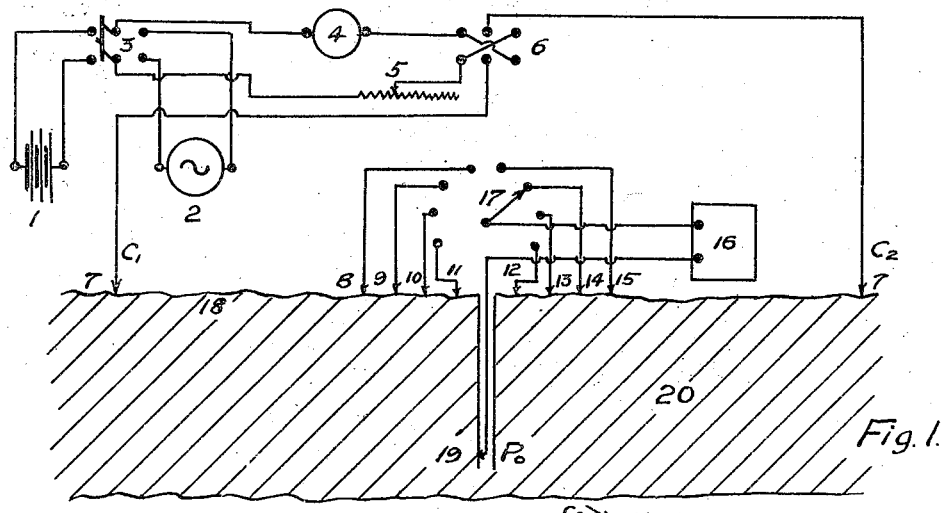
Fig. 1 is a diagram showing one embodiment applied to a portion of the earth shown in cross-section.

Means are provided in Fig. 1 for supplying direct current from source 1, and alternating current from source 2 to the ground terminals through energizing leads 7. Two or more of such units are used in Fig. 15 for multiple ground current contacts. These ground currents can be adjusted to specified values as indicated by the meter 4 and the variable impedance 5. The potential electrode Po can be placed in the well or on the ground. Other potential ground contacts are made at 8, 9, 10, 11, 12, 13, 14 and 15 in such a way as to cover the ground around the well on a straight line or radius preferably having equal space intervals between them. A potential measuring or recording instrument 16 is connected for measuring these potentials as by a multicontact switch 17. The potential contacts are applied to the ground surface 18. A cross-section of the ground 20 is shown in Fig. 1. There is a definite advantage of being able to recycle the ground, so to speak, after a direct current has been applied. It has been found that the polarization of the ground is changed by applying D.-C. and A.-C. can be used to bring the ground back to its normal condition. Measurements on the ground are somewhat similar to magnetization of iron in that the ground has a certain retentivity of polarization. It is not only necessary to keep at least certain distances from the current stakes but the potential contacts 8 to 15 should be at increasing radii, preferably of equal intervals, in the direction in which the greatest potential gradient would occur in an isotropic medium.

Figure 2:
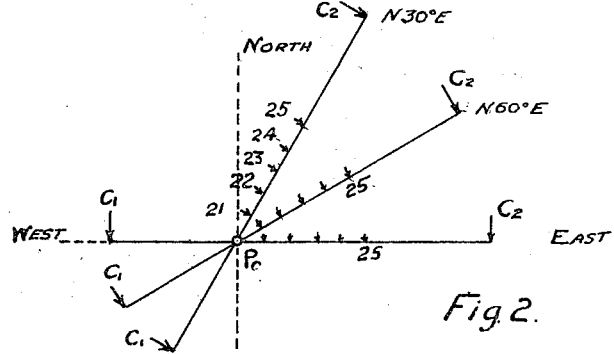
Fig. 2 is a diagram in plan showing a system of ground contacts which permits the covering of the greatest area or extension for a given set of current contacts.

A greater radial spread can be obtained by offsetting Po from the center position shown in Fig. 2. This extreme position would correspond to ground contact 8 or 15 of Fig. 1. In all measurements for potential positions of radius 21 along the various azimuthal lines such as E—W, N60E, N30E, etc., the current applied to the ground is adjusted to constancy by hand or automatic control of the current, and the same applies to positions of radius 22, 23, 24 and 25, Fig. 2. In the positions of intersections of the radial and circumferential orbits shown in Fig. 3 as 26, 27, 28, 30 on azimuth N30E the functions $f(E,I,r)$ have definite value where they intersect the circles A, B, C and D of Fig. 3. In other words this specification teaches that by the use of certain specific ground patterns of measurements it is possible to obtain data which can be interpreted in an unambiguous manner, as opposed to the guess-work involved where only haphazard observations are taken in an uncontrolled manner.

Figure 3:
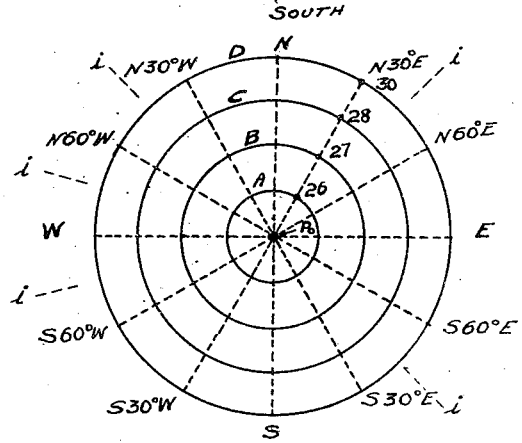
Fig. 3 is a diagram showing the pattern of observations for maximum interpretation values about a central surface or surface-remote contact.

A development of the data related to these circles of Fig. 3 is shown in Figs. 4, 5, 6 and 7. Here the values in question such as resistivity, conductivity, polarization, etc., represented broadly by $f(E,I,r)$ are charted in their azimuthal location producing the graph 31 in each of the above figures. By selecting boundaries 32 as limits of interpretation common to all charts it is possible to define and grade the anomalies upon a uniform number or value system. These are designated as points $a, b, c, d, e$ and $f$ in Figs. 4, 5, 6 and 7. It will be noticed that these points are not on the intersection of azimuthal lines and circles of Fig. 3 but fall at different azimuth positions on each circle. In this way the same features may be present for each circle but limited to different azimuths in each. By charting this limitation on each circle of Fig. 8 it is possible to determine the nature of the geologic bodies 41 and 42. The positions $a, b, c, d, e$ and $f$ are carried forward into the diagram of Fig. 8.

Figure 9:
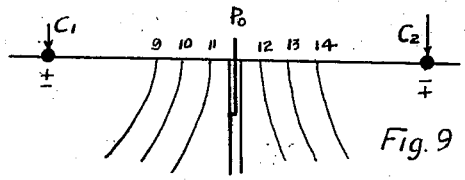
Fig. 9 is a diagram showing essential equipotential lines in relation to a set of ground contacts.

From this diagram it will be seen that there is a distinct advantage of working in a circular line about a central point of observation or hub, where the equipotential lines are uniform about a point Po in Fig. 9. Currents flow in the directions of greatest potential gradient directed along an azimuthal line through the hub Po, which is preferably located at about the level to be investigated in accordance with my Patent No. 2,440,693, but may be on the ground as in my earlier Patent No. 2,345,608. In executing these field observations the distances, Po to $C_1$ and $C_2$, are very great; e. g., of the order of 5000 to 6000 feet for deep wells, compared to the distances $P_oP_1$ and $P_oP_2$ which are only one-third as great. The cost of surveying the lines and clearing the underbrush to enable the wires to be run for each azimuth, of which there are generally eight or more, involves great expense in both time and money. By the present invention it is possible to measure the various azimuthal directions of potentials according to Fig. 9 by only one configuration of the current contacts $C_1, C_2, C_3$ and $C_4$ in Figs. 10, 11, 12 and 13. All of these contacts need not be but are preferably at equal distances from Po and divide the plane preferably also into four quadrants. If desired intermediate azimuthal directions may be investigated, in the particular directions indicated by the relation of the values of the points of intersection relative to the threshold value 32, as indicated at $i$, Fig. 3. This practice, which would be very difficult and expensive with the normal procedure using two current electrodes on the baseline of direction, becomes practically negligible in cost when employing the phantom base-line method of the present invention.

Figure 10:
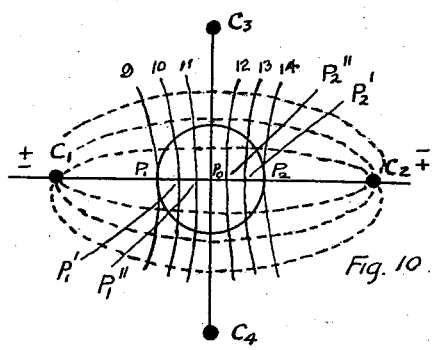
Figs. 10, 11, 12 and 13 are diagrams illustrating the rotation of the field of observation to various directions in accordance with the preferred form of the present invention.
Figure 15:
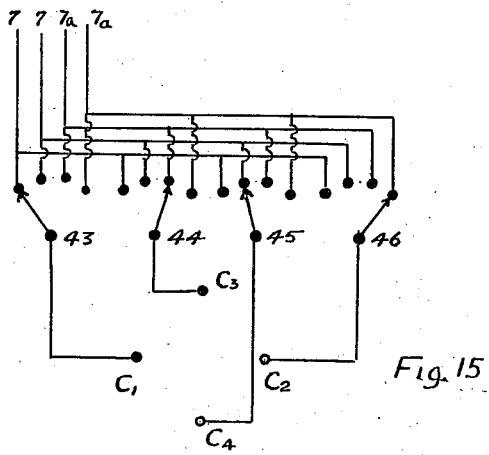
Fig. 15 is a diagram of a selector switch system for supplying proper currents and polarities to the configuration of Figs. 10 to 13, to orient the field in the several directions shown.

Referring to Figs. 10 to 14, these illustrate a set of operations in accordance with the present invention, utilizing a square configuration of current electrodes and two current sources as exemplified in Fig. 15. As shown in Fig. 10, the first operation may consist in energizing, as from leads 7, Figs. 1 and 15, only the pair of electrodes C, $C_2$ shown in Fig. 10 as on an east-west base-line. This energization produces potential shells 9, 10, 11, etc., Fig. 10, the values of which are measured at their points of crossing of the physical base-line $C_1$, $C_2$ as by measurements made between $P_0$ and $P_1$, $P_{1'}$, $P_{1''}$, respectively, on the one hand, and between $P_0$ and $P_2$, $P_{2'}$, $P_{2''}$, respectively, on the other, these measurements being made by suitable potential measuring circuits, as exemplified in Fig. 1. Direct current flow may be maintained in one direction for all these measurements, but is preferably maintained in one direction for the $P_0$ to $P_1$ measurements, and reversed, after a period of excitation with alternating current, for the $P_0$ to $P_2$ measurements, such reversal being easily accomplished as by switch 6, Fig. 1. The current magnitude is preferably maintained constant during all these measurements.

Figure 11:
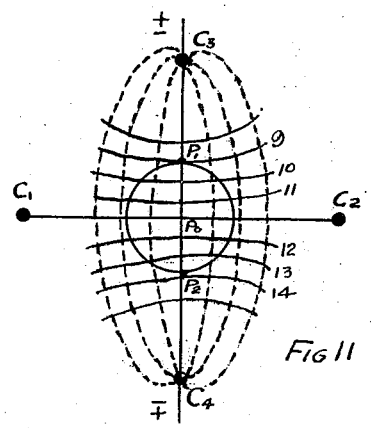

The second operation, as shown in Fig. 11, is similarly performed, but with the current electrodes $C_3$—$C_4$, only, energized from a second current source through leads $7a$ (Fig. 15). This second source is preferably identical with the source supplying leads 7 (Figs. 1 and 15). In the preferred embodiment, the electrodes $C_1$, $C_2$, $C_3$ and $C_4$ are arranged at the corners of a square and are equidistant from the center of the square area, at which the point $P_0$ is located, and the same current values are established on the physical base-lines $C_1$—$C_2$, $C_3$—$C_4$ in the operations illustrated in Figs. 10 and 11, and on the phantom base-lines employed in the operations of Figs. 12 and 13 or in intermediate regions of observation.

The current application in the operations exemplified in Figs. 10, 11 may follow the teachings of my prior patents, and the potential measurements in Figs. 10 and 11 are taken on the physical base-lines $C_1$—$C_2$ as in my prior patents.

Figure 12:
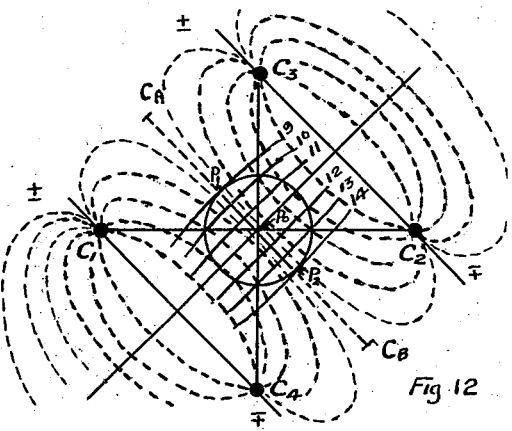
Figure 13:
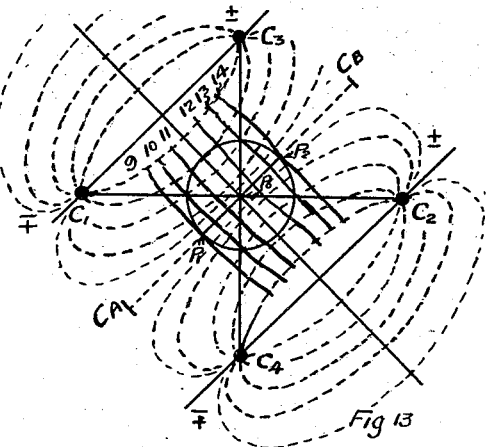

The third operation, exemplified in Fig. 12, employs a phantom base-line in accordance with the present invention. In this operation, both pairs of current contacts $C_1$—$C_2$ and $C_3$—$C_4$ are simultaneously energized, preferably with currents so selected from Equation 3 that the difference of potential between $P_0$ and $P_1$, and between $P_0$ and $P_2$, respectively, at given spacing in an isotropic medium, would be equal to the value employed in the operations of Figs. 10 and 11. In Fig. 12, current leads 7 of Figs. 1 and 15 are connected to $C_1$ and $C_2$, and current leads $7a$ to contacts $C_3$ and $C_4$, and each pair is supplied with a current value substantially equal to that employed in Fig. 10 or Fig. 11 divided by a predetermined constant; i. e., a current which for the conditions of Figs. 12 and 13 has a value about five-sixths of that employed in Figs. 10 and 11, to produce, in an isotropic medium, a potential gradient in a direction at 45° to the current base-lines and substantially equal to that employed in Figs. 10 and 11. Notwithstanding that the two current sources are connected to the opposite ends of the two diagonals of the square configuration, the potential gradients and current flows between potential gradients serve to produce in effect a phantom base-line; i. e., line of greatest potential gradient in an isotropic medium, rotated to a position at an angle, 45° in the example given, to the physical base-lines $C_1$—$C_2$ and $C_3$—$C_4$. With equal currents from the two sources and equal spacing, this phantom base-line $C_A$—$C_B$ lies in the northwest-southeast direction when contacts $C_1$ and $C_3$ are of like polarity (Fig. 12), and in the northeast-southwest direction when contacts $C_1$ and $C_4$ have like polarity (Fig. 13). Thus the measurements of the potentials between $P_0$ and $P_1$, $P_{1'}$, $P_{1''}$ and between $P_0$ and $P_2$, $P_{2'}$, $P_{2''}$, respectively, may now be made under conditions comparable with those for the operations of Figs. 10 and 11, but on the phantom base-lines $C_A$—$C_B$, respectively, just as though these lines had been brushed out to their extreme ends $C_A$ and $C_B$, for the purpose of locating current contacts thereat. As before, it is preferable that the currents be reversed (as indicated by the polarity symbols in Figs. 12 and 13) between the readings on either side of the center of observation $P_0$, though this is not essential in the broader application of the invention.

Figure 14:
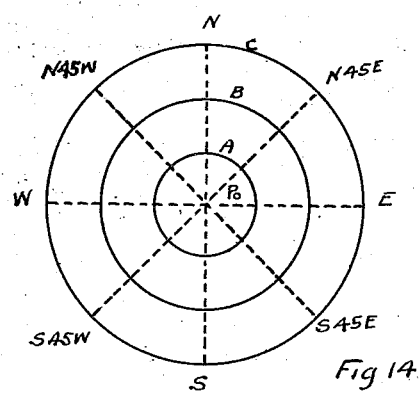
Fig. 14 is a diagram showing the directions measured by the special configuration and adjustments shown in Figs. 10 to 13.

As is shown in Fig. 14, with the single configuration $C_1$—$C_2$—$C_3$—$C_4$ employed in Figs. 10–13, eight directions of observation have been obtained; i. e., in north, south, east and west directions, and in directions at 45° thereto in the illustrative example.

For turning the potential field 45°, the currents applied at $C_1$, $C_2$, $C_3$ and $C_4$ were of the same value but not of the same polarity. The polarity chosen was to set up current fields as shown in Figs. 12 and 13. By adjusting the relative values of the currents applied to contacts $C_1$, $C_2$, and to contacts $C_3$, $C_4$, respectively, in accordance with Equation 3, it is possible to adjust the direction of the maximum potential gradient or phantom base-line ($C_A$—$C_B$) into any azimuthal direction desired. In other words the artificial axis or phantom base-line $C_A$—$C_B$ in effect is rotated. By adjusting the intensity of the currents of the selected relative values, the same maximum potential difference $P_0P_1$, $P_0P_2$ for isotropic conditions in the new direction may be established, thus giving substantially the same results as obtained in Figs. 10 and 11 and eliminating necessity for calculation of corrections.

Suitable power sources similar to the sources 1 and 2 in Fig. 1 are connected at 7 and $7a$ in Fig. 15. By a simple selector switch system 43, 44, 45 and 46 the currents applied to $C_1$, $C_2$ and $C_3$, $C_4$ can be applied separately, and in combination, and adjusted in polarity, and by suitable means, as the resistors 5, Fig. 1, the values thereof may be adjusted as desired for accomplishing the objects herein set forth.

It should be mentioned that the same effect can be obtained with more than four ground contacts using Equation 3 but at a sacrifice of economy in equipment as well as in field operation. Fundamentally the present invention discloses how to obtain a plurality of potential gradients in selected directions in the earth using a plurality of current ground contacts less in number than the potential gradient directions, by employing plural currents and adjusting the currents to values appropriate for accomplishing this objective, and it is therefore clear that while the preferred arrangement, effecting this result in the simplest possible manner, is disclosed specifically herein, this arrangement is illustrative, and not restrictive of the invention, which is defined in the appended claims. In such claims, where reference is made to a "center contact" this has reference to either a surface contact or a remote-from-the-surface contact, and when reference is made to a "line extending from said center contact," it is to be understood that this line may extend from the projection of the center contact to the earth's surface in the case when a surface-remote center contact is employed.

From the foregoing description of preferred embodiments it will be apparent that the elimination of brushing-out for current lines in the directions exemplified at $C_A$, $C_B$ in Figs. 12 and 13 is only one of the advantages of the present phantom base-line system. Among the other advantages of this new arrangement may be mentioned the fact that it allows measurements to be made as though current contacts were located in desired positions, even when such positions are inaccessible for some reason such as the presence of rivers, lakes, urban or other restricted or built-up areas, railroad yards, or local geologic bodies. Moreover, the employment of the phantom base-line allows potential measurements and the like to be made to points $P_1$, etc., further out from the center of observation than would be possible with a physical base-line, where too close approach to the current contacts would introduce complications and errors due to excessive density and lack of depth of the current fields in proximity to such contacts. Thus by employment of this invention, not only can the number of azimuthal directions of observation compared to the number of directions of current input be increased, but also, the depth and range of observations, on the phantom base-line, can be increased for a given length of current leads or the like. It will also be appreciated that the current and potential fields, created with respect to the phantom base-lines by the present invention, are symmetrical about two planes at right angles to each other and hence facilitate geologic differentiation by direct comparison of values, and enable comparable observations to be made on both sides of the center of observation without physical rotation of the phantom base-line through 180°. Furthermore, the phantom base-line provided by the present invention retains the advantage previously obtained with physical base-lines by the Lee configuration of my prior Patents Nos. 1,951,760; 2,277,707 and 2,440,693, that the plane of symmetry perpendicular to the base-line through the center of observation, under isotropic conditions, is also the plane of zero-potential; i. e., a plane the potential of which is the exact mean between the potentials applied across the current contacts $C_1C_2$. Thus no large potential base is present to obscure the small potential variations created by the geologic anomalies. Thus also, if desired, the factor of transverse as well as direct resistivity, when making direct current observations, or the factor of transverse as well as direct impedicivity, when making alternating current observations, which factors were measured with respect to physical base-lines in my prior Patent No. 2,345,608, may with equal facility be measured with respect to the symmetrical phantom base-lines afforded by the present invention.

The invention and its applications thus are not limited to the particular embodiments herein disclosed to exemplify the same, and such embodiments are to be taken as illustrative, but not restrictive, of the invention, which is defined in the appended claims.

What I claim is:

1. The method of geophysical surveying which comprises establishing a potential contact with the earth at a center of observation, establishing at least two pairs of current contacts with the earth at the ends of current base-lines crossing one another at said center and with said current contacts remote from said center, supplying currents to said respective pairs of current contacts, adjusting said currents to produce resultant potential gradients in the earth corresponding to a phantom current base-line rotated in azimuth about said center relative to the established base-lines, and measuring the potential differences between said center potential contact and points on said phantom base-line.

2. The method of geophysical surveying which comprises establishing a potential contact with the earth at a center of observation, establishing current contacts with the earth at the ends of two current base-lines crossing one another at said center and with said current contacts remote from said center, supplying direct current to one of said pairs of contacts and measuring the potential differences between said center contact and points on the current base-line thereof, supplying direct current to the other pair of current contacts and measuring the potential differences between said center contact and points on the current base-line thereof, and supplying direct currents to both said pairs of contacts adjusted to produce resultant potential gradients in the earth corresponding to a phantom current base-line rotated in azimuth about said center relative to the established base-lines and measuring the potential differences between said center potential contact and points on said phantom base-line.

3. The method of geophysical surveying which comprises establishing a potential contact with the earth at a center of observation, establishing current contacts with the earth at the opposite ends of the diagonals of a square symmetrical about said center contact, supplying direct current to said current contacts on one diagonal and measuring the potential differences between said center contact and points on said diagonal, supplying direct current to the current contacts on the other diagonal and measuring the potential differences between said center contact and points on that diagonal, and supplying equal direct currents to the contacts on both diagonals and measuring the potential differences between said center contact and points on a line at forty-five degrees to said diagonals.

4. A method according to claim 3, in which, following the last-named measurements, the relative polarity of the equal currents supplied concurrently to the contacts on both diagonals is reversed and potential differences are then measured between said center contact and points on a line at right angles to said forty-five degree line.

5. A method according to claim 3, in which currents of the same value are employed in supplying the respective diagonals separately, and in which currents each of about five-sixths of said value are employed in supplying each of said diagonals concurrently.

6. A method according to claim 3, in which the direct currents supplied to the diagonals are polarized in one direction for potential measurements to points on one side of the center contact, and in the other direction for potential measurements to points on the other side of the center contact.

7. A method according to claim 6, in which alternating currents are supplied to said current contacts between the intervals of supply of direct currents thereto.

8. The method of geophysical surveying which comprises establishing a potential contact with the earth at a center of observation, establishing current contacts with the earth at the opposite ends of the diagonals of a square symmetrical about said center contact, supplying direct current to said current contacts on one diagonal and measuring the potential differences between said center contact and points on said diagonal, supplying direct current to the current contacts on the other diagonal and measuring the potential differences between said center contact and points on that diagonal, and supplying direct currents concurrently to the contacts on both diagonals and measuring the potential differences created in the earth thereby between said center contact and points on a line extending therefrom between said diagonals in a position determined by the relative values of the currents concurrently supplied to said diagonals, substantially as described.

9. The method of geophysical surveying which comprises establishing a potential contact with the earth at a center of observation, establishing current contacts with the earth at the ends of a current base-line extending through said center contact, supplying direct current of one polarity to said current contacts, measuring the potential differences created thereby between said center contact and points on said current base-line at one side of said center contact, supplying alternating current to said current contacts for an interval of time, and then supplying thereto direct current of the same value but of opposite polarity and measuring the potential differences created thereby between said center contact and points on said current base-line at the other side of said center contact.

FREDERICK W. LEE.

REFERENCES CITED

The following references are of record in the file of this patent:

UNITED STATES PATENTS

| Number | Name | Date |
| --- | --- | --- |
| 1,842,361 | Nichols | Jan. 19, 1932 |
| 1,842,362 | Nichols | Jan. 19, 1932 |